US010885453B2

(12) United States Patent
Nitta et al.

(10) Patent No.: US 10,885,453 B2
(45) Date of Patent: Jan. 5, 2021

(54) CALCULATION DEVICE, CALCULATION METHOD, AND NON-TRANSITORY COMPUTER-READABLE RECORDING MEDIUM

(71) Applicant: YAHOO JAPAN CORPORATION, Tokyo (JP)

(72) Inventors: Kiyoshi Nitta, Tokyo (JP); Iztok Savnik, Koper (SI)

(73) Assignee: YAHOO JAPAN CORPORATION, Tokyo (JP)

( * ) Notice: Subject to any disclaimer, the term of this patent is extended or adjusted under 35 U.S.C. 154(b) by 725 days.

(21) Appl. No.: 15/693,677

(22) Filed: Sep. 1, 2017

(65) Prior Publication Data
US 2018/0150759 A1    May 31, 2018

(30) Foreign Application Priority Data

Nov. 25, 2016 (JP) .................. 2016-229299

(51) Int. Cl.
| G06F 16/30 | (2019.01) |
| G06N 7/00 | (2006.01) |
| G06N 5/02 | (2006.01) |
| G06N 5/04 | (2006.01) |
| G06F 17/18 | (2006.01) |

(52) U.S. Cl.
CPC ............ G06N 7/005 (2013.01); G06N 5/022 (2013.01); G06N 5/046 (2013.01); G06F 17/18 (2013.01)

(58) Field of Classification Search
CPC ..................................................... G06F 17/18
See application file for complete search history.

(56) References Cited

U.S. PATENT DOCUMENTS

| 2008/0195570 A1 | 8/2008 | Alsafadi et al. |
| 2011/0225167 A1* | 9/2011 | Bhattacharjee ....... G06F 16/284 |
| | | 707/747 |
| 2011/0238610 A1 | 9/2011 | Lee et al. |

(Continued)

FOREIGN PATENT DOCUMENTS

| JP | 2008-537821 A | 9/2008 |
| JP | 2010-205265 A | 9/2010 |

(Continued)

OTHER PUBLICATIONS

Article entitled "A Distributed Query Execution Method for RDF Storage Managers", by Nitta et al., dated Oct. 2014.*

(Continued)

*Primary Examiner* — Mahesh H Dwivedi
(74) *Attorney, Agent, or Firm* — Oliff PLC

(57) ABSTRACT

A calculation device according to the present application includes an acquiring unit and a calculation unit. The acquiring unit that acquires a plurality of pieces of first triple information indicating a relationship related to three types of elements and a plurality of pieces of second triple information obtained based on a conceptual system in the plurality of pieces of the first triple information. The calculation unit that calculates statistical information related to the plurality of pieces of the first triple information based on the number of pieces of the first triple information associated with each of the plurality of pieces of the second triple information acquired by the acquiring unit.

12 Claims, 9 Drawing Sheets

(56) References Cited

U.S. PATENT DOCUMENTS

2014/0297621 A1* 10/2014 Hu .................... G06F 16/24545
  707/722
2014/0304251 A1* 10/2014 Bornea ............. G06F 16/24542
  707/718
2014/0358949 A1   12/2014 Hu et al.
2015/0142829 A1*  5/2015 Lee ....................... G06F 16/278
  707/749
2015/0339379 A1   11/2015 Inagaki
2016/0132572 A1*  5/2016 Chang .................. G06F 16/116
  707/723

FOREIGN PATENT DOCUMENTS

| JP | 2014-232532 A | 12/2014 |
| JP | 2015-099586 A | 5/2015 |
| JP | 2015-225371 A | 12/2015 |
| WO | 2006/103615 A1 | 10/2006 |

OTHER PUBLICATIONS

Article entitled "Method of Big-Graph Partitioning Using a Skeleton Graph" by Savnik et al., dated 2019.*
Dec. 8, 2017 Search Report issued in Japanese Patent Application No. 2016-229299.
Dec. 26, 2017 Decision to Grant issued in Japanese Patent Application No. 2016-229299.
Savnik et al.; "Triple-store statistics based on conceptual schemata;" Preprint submitted to Elsevier; Dec. 8, 2017.

* cited by examiner

| FIRST TRIPLE ID | Subject | Predicate | Object | ... |
|---|---|---|---|---|
| ... | ... | ... | ... | ... |
| FID11 | <Jim> | <worksAt> | <HOGE.inc> | ... |
| ... | ... | ... | ... | ... |
| FID21 | <Jim> | <hasAge> | 32 | ... |
| ... | ... | ... | ... | ... |
| FID201 | <Tom> | <plays> | <football> | ... |
| ... | ... | ... | ... | ... |
| FID1105 | <Abbie> | <livesIn> | <Texas> | ... |
| ... | ... | ... | ... | ... |
| ... | ... | ... | ... | ... |

FIG.5

| SECOND TRIPLE ID | Subject | Predicate | Object | HIERARCHY INFORMATION | | ... | STATISTICAL INFORMATION | | ... |
| | | | | HIGHER LEVEL 1 | HIGHER LEVEL 2 | | HIER-ARCHY | COUNT VALUE | |
|---|---|---|---|---|---|---|---|---|---|
| ... | ... | ... | ... | ... | ... | ... | ... | ... | ... |
| SID11 | <person> | <worksAt> | <organization> | - | - | ... | 1 | 100000 | ... |
| ... | ... | ... | ... | ... | ... | ... | ... | ... | ... |
| SID21 | <person> | <worksAt> | <company> | SID11 | - | ... | 2 | 15000 | ... |
| SID22 | <employee> | <worksAt> | <organization> | SID11 | - | ... | 2 | 12000 | ... |
| ... | ... | ... | ... | ... | ... | ... | ... | ... | ... |
| SID31 | <employee> | <worksAt> | <company> | SID21 | SID22 | ... | 3 | 5000 | ... |
| SID32 | <engineer> | <worksAt> | <organization> | SID22 | - | ... | 3 | 2000 | ... |
| ... | ... | ... | ... | ... | ... | ... | ... | ... | ... |
| SID41 | <engineer> | <worksAt> | <company> | SID31 | SID32 | ... | 4 | 800 | ... |
| ... | ... | ... | ... | ... | ... | ... | ... | ... | ... |

| ONTOLOGY ID | Subject | Predicate | Object | ... |
|---|---|---|---|---|
| ... | ... | ... | ... | ... |
| TID101 | <worksAt> | rdfs:domain | <person> | ... |
| TID102 | <worksAt> | rdfs:range | <organization> | ... |
| ... | ... | ... | ... | ... |
| TID201 | <ceo> | rdfs:subClassOf | <officer> | ... |
| TID202 | <father> | rdfs:subClassOf | <parent> | ... |
| ... | ... | ... | ... | ... |
| TID211 | <officer> | rdfs:subClassOf | <owner> | ... |
| TID212 | <officer> | rdfs:subClassOf | <engineer> | ... |
| ... | ... | ... | ... | ... |
| TID221 | <owner> | rdfs:subClassOf | <person> | ... |
| TID222 | <engineer> | rdfs:subClassOf | <employee> | ... |
| ... | ... | ... | ... | ... |
| TID231 | <employee> | rdfs:subClassOf | <person> | ... |
| ... | ... | ... | ... | ... |
| TID301 | <commercial company> | rdfs:subClassOf | <company limited> | ... |
| ... | ... | ... | ... | ... |
| TID311 | <company limited> | rdfs:subClassOf | <company> | ... |
| ... | ... | ... | ... | ... |
| TID321 | <company> | rdfs:subClassOf | <organization> | ... |
| ... | ... | ... | ... | ... |
| TID501 | <Jim> | rdf:type | <ceo> | ... |
| TID502 | <Jim> | rdf:type | <father> | ... |
| ... | ... | ... | ... | ... |
| TID505 | <HOGE.inc> | rdf:type | <commercial company> | ... |
| ... | ... | ... | ... | ... |

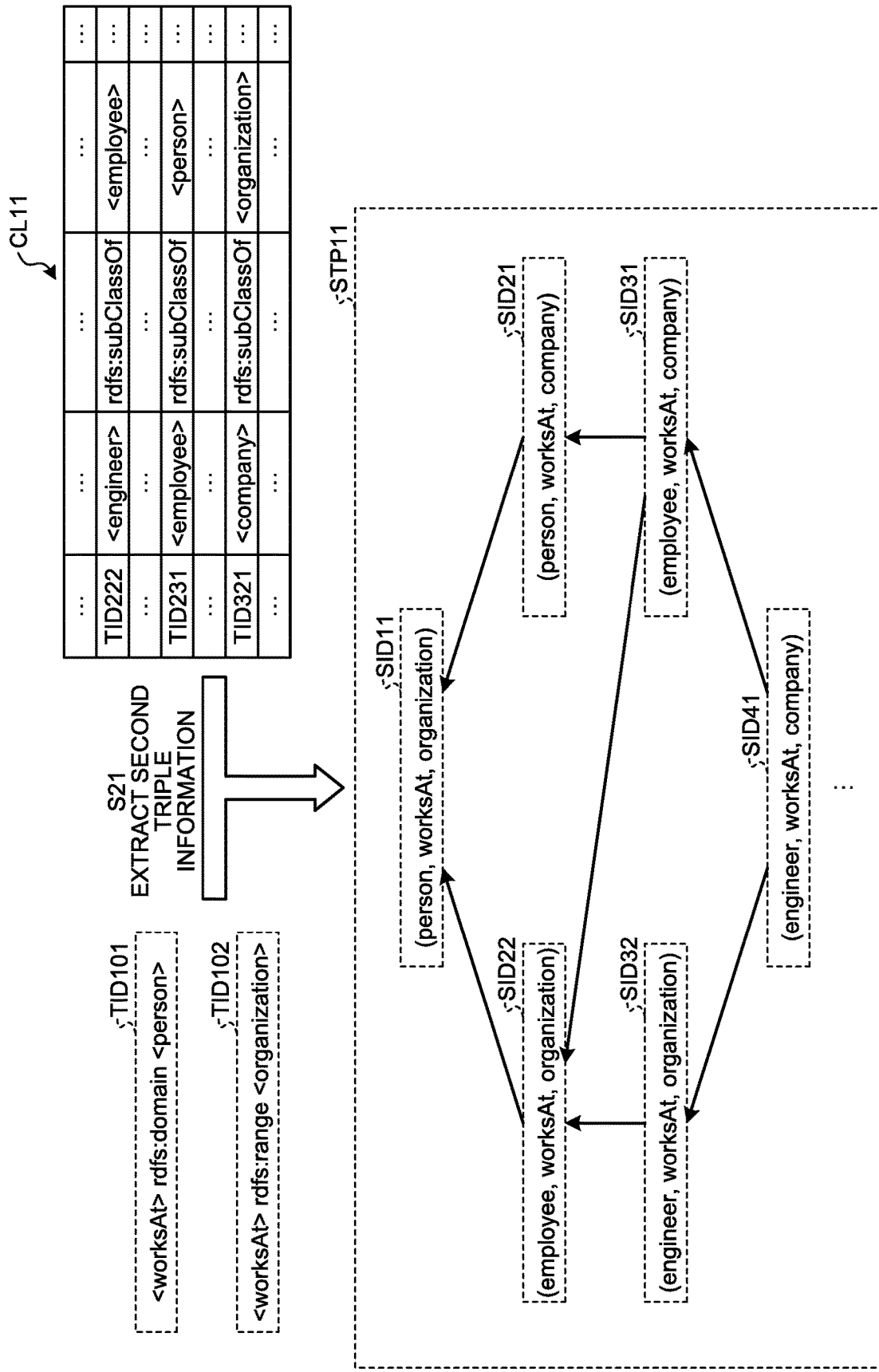

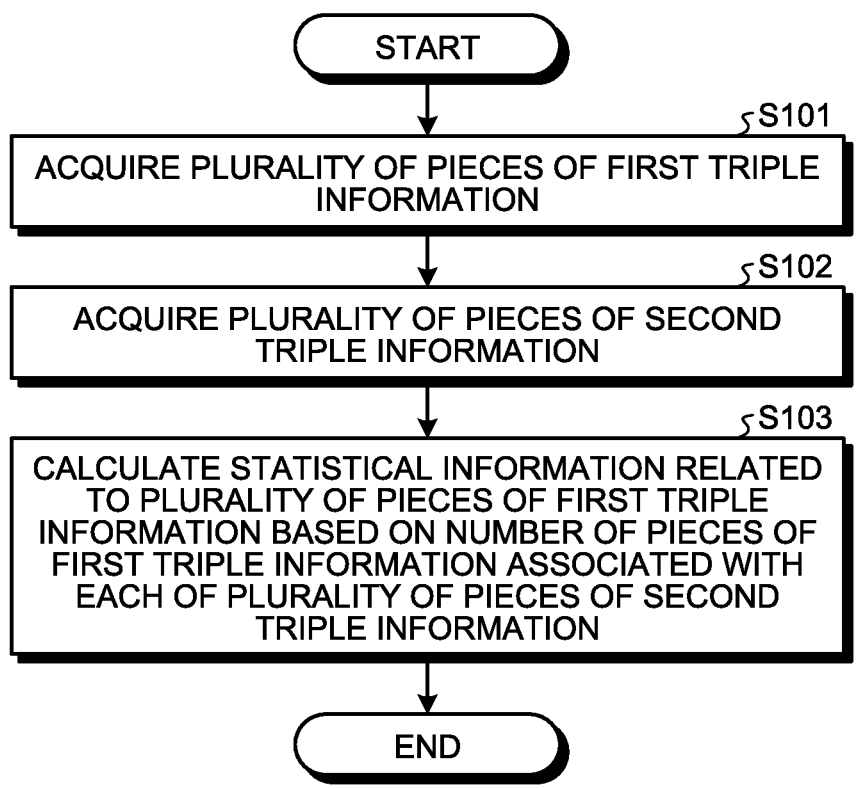

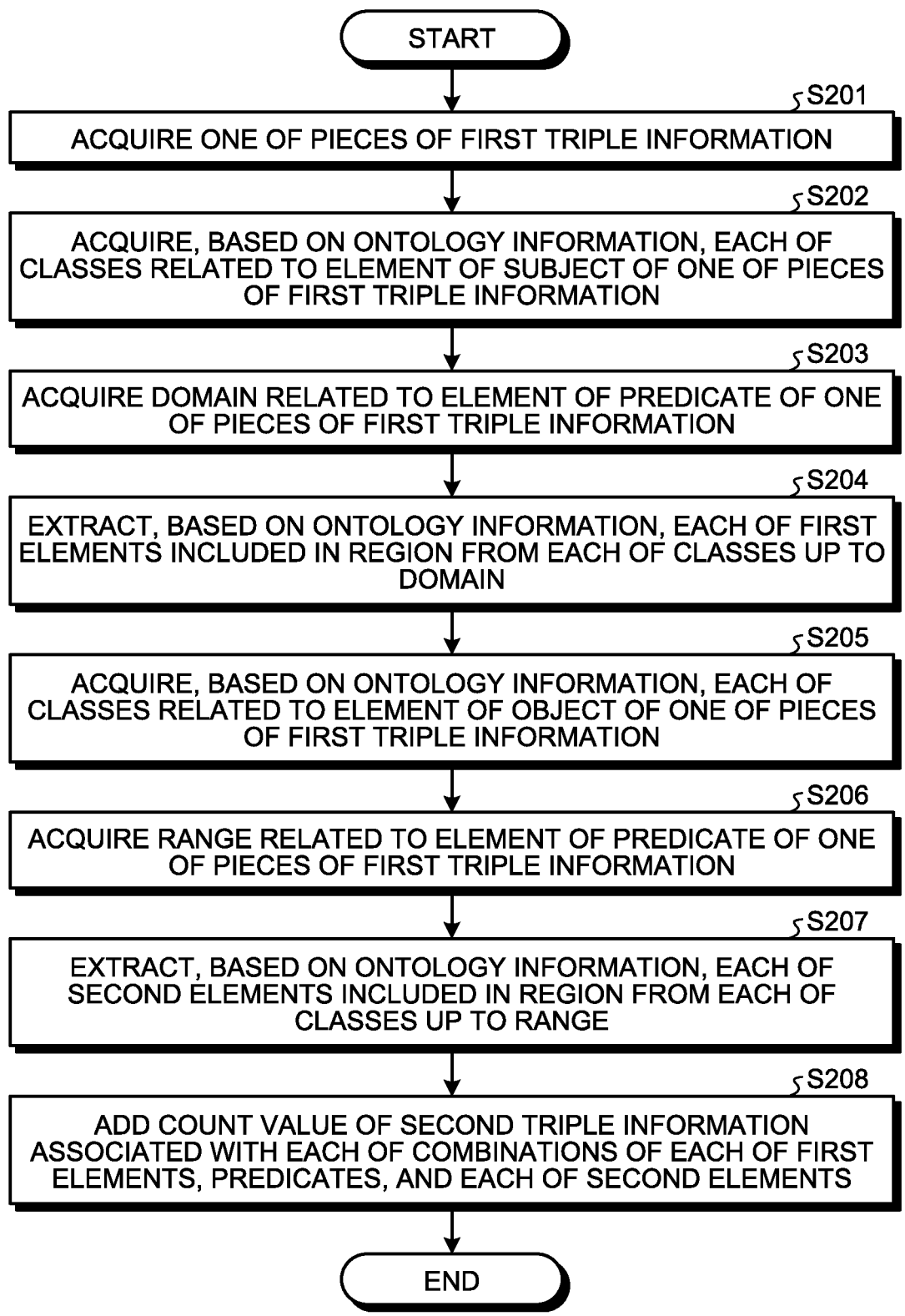

US 10,885,453 B2

CALCULATION DEVICE, CALCULATION METHOD, AND NON-TRANSITORY COMPUTER-READABLE RECORDING MEDIUM

CROSS-REFERENCE TO RELATED APPLICATION(S)

The present application claims priority to and incorporates by reference the entire contents of Japanese Patent Application No. 2016-229299 filed in Japan on Nov. 25, 2016.

BACKGROUND OF THE INVENTION

1. Field of the Invention

The present invention relates to a calculation device, a calculation method, and a non-transitory computer-readable recording medium.

2. Description of the Related Art

Conventionally, the Resource Description Framework (RDF) is known as the framework of describing resources in a network. Furthermore, in the RDF data model, three elements of the subject, the predicate, and the object referred to as triple represent the relationship in the resources. For example, there is a provided technology of distributing information to a plurality of data storage units because an amount of triple data (triple information) with respect to graph data that is encoded as triple and that is stored is huge.

However, with the conventional technology described above, a conceptual system in a plurality of pieces of triple information is not always able to be statistically grasped. For example, by only storing the triple information using a distributed network, it is sometimes difficult to statistically grasp the conceptual system in a plurality of pieces of triple information, such as conceptual distribution of the plurality of pieces of the stored triple information.

SUMMARY OF THE INVENTION

It is an object of the present invention to at least partially solve the problems in the conventional technology.

According to one aspect of an embodiment, a calculation device includes an acquiring unit that acquires a plurality of pieces of first triple information indicating a relationship related to three types of elements and a plurality of pieces of second triple information obtained based on a conceptual system in the plurality of pieces of the first triple information; and a calculation unit that calculates statistical information related to the plurality of pieces of the first triple information based on the number of pieces of the first triple information associated with each of the plurality of pieces of the second triple information acquired by the acquiring unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of a first triple information storage unit according to the embodiment;

FIG. 5 is a diagram illustrating an example of a second triple information storage unit according to the embodiment;

FIG. 6 is a diagram illustrating an example of an ontology information storage unit according to the embodiment;

FIG. 7 is a diagram illustrating extraction of second triple information according to the embodiment;

FIG. 8 is a flowchart illustrating an example of the calculation process according to the embodiment;

FIG. 9 is a flowchart illustrating an example of the calculation process performed on one of pieces of triple information according to the embodiment.

DETAILED DESCRIPTION OF THE PREFERRED EMBODIMENTS

Figure 1:
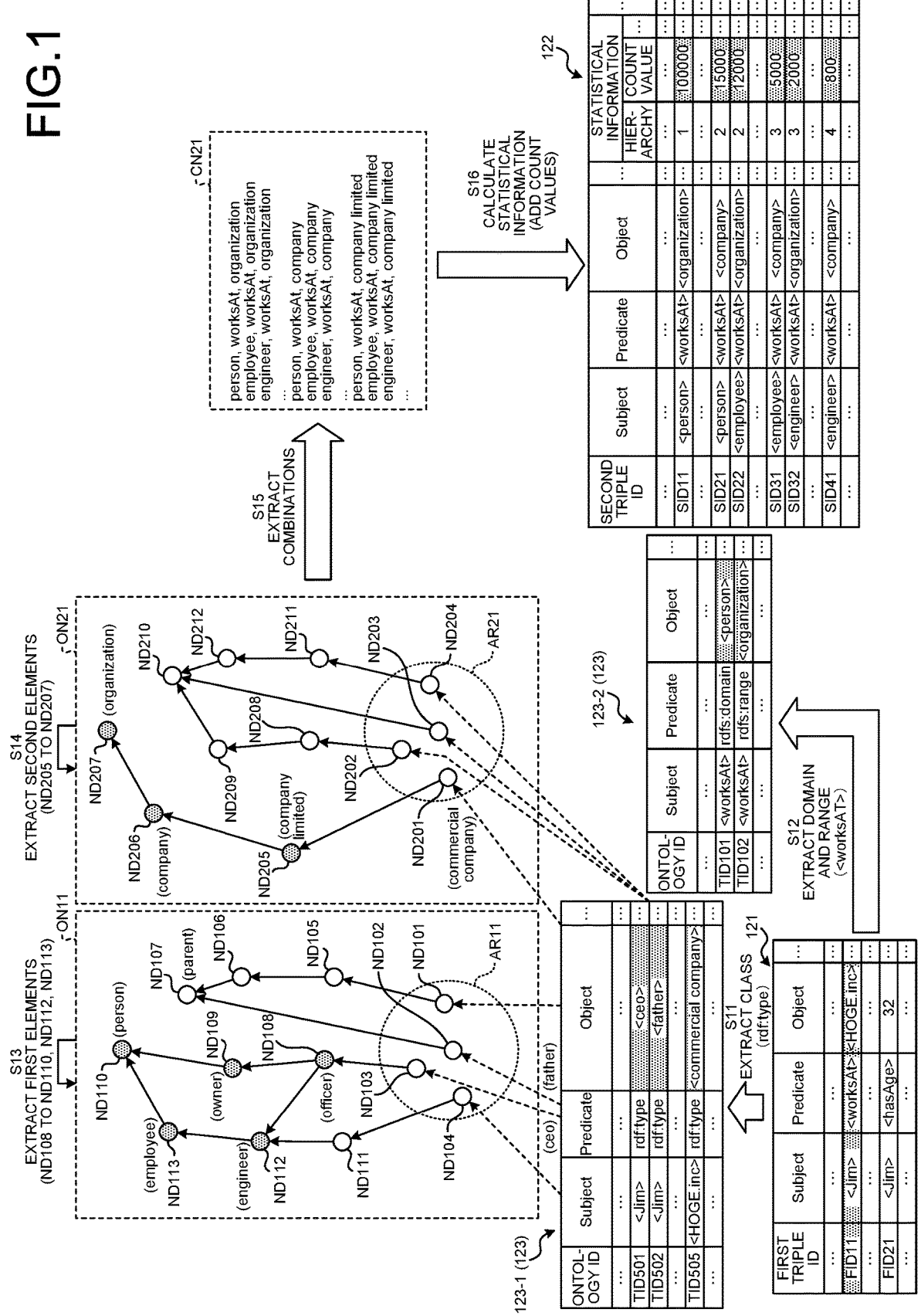
FIG. 1 is a diagram illustrating an example of a calculation process according to an embodiment.

A mode (hereinafter, referred to as an "embodiment") for carrying out a calculation device, a calculation method, and a calculation program according to the present invention will be described in detail below with reference to the accompanying drawings. The calculation device, the calculation method, and the calculation program are not limited by the embodiment. Furthermore, in the embodiments below, the same components are denoted by the same reference numerals and an overlapping description will be omitted.

Embodiment

1. Calculation Process

An example of a calculation process according to an embodiment will be described with reference to FIG. 1. FIG. 1 is a diagram illustrating an example of a calculation process according to an embodiment. FIG. 1 illustrates a case in which a calculation device 100 (see FIG. 3) calculates statistical information related to triple information stored in a first triple information storage unit 121. Furthermore, the triple information mentioned here is information that is based on a data model of the Resource Description Framework (RDF) and that represents the relationship, in the resources, among three elements (triple) of a subject, a predicate, and an object. Furthermore, in a description below, the triple information stored in the first triple information storage unit 121 is sometimes referred to as first triple information, the triple information stored in a second triple information storage unit 122 is sometimes referred to as second triple information, and the triple information stored in an ontology information storage unit 123 is sometimes referred to as ontology information. Furthermore, descriptions of the second triple information storage unit 122 and the ontology information storage unit 123 will be described in detail later.

In the first triple information storage unit 121 illustrated in FIG. 1, a triple information group that is the calculation target of the statistical information is stored. The example illustrated in FIG. 1 indicates a case in which the calculation device 100 calculates statistical information targeted for the first triple information FID11 identified by the first triple ID "FID11" stored in the triple information group in the first triple information storage unit 121. Furthermore, the first triple information storage unit 121 illustrated in FIG. 1 corresponds to the first triple information storage unit 121 illustrated in FIG. 4 and only the portion related to the description of FIG. 1 is illustrated.

As described above, if "first triple information FID* (* is an arbitrary numerical value)" is described, the first triple information indicates the triple information identified by the first triple ID "FID*". For example, if the "first triple information FID21" is described, the subject triple information is the triple information that is identified by the first triple ID "FID21".

For example, the first triple information storage unit 121 illustrated in FIG. 1 includes items, such as "first triple ID", "Subject", "Predicate", "Object", and the like.

The "first triple ID" indicates the identification information for identifying the triple information. The "Subject" indicates the value associated with the subject of the triple information identified by the first triple ID. Furthermore, the "Predicate" indicates the value associated with the predicate of the triple information identified by the first triple ID. The "Object" indicates the value associated with the object of the triple information identified by the first triple ID.

For example, in the example illustrated in FIG. 1, the first triple information FID11 indicates that the subject is "<Jim>", i.e., a predetermined human "Jim". Furthermore, for example, in the example illustrated in FIG. 1, the first triple information FID11 indicates that the predicate is "<worksAt>", i.e., the predicate having the meaning of "works at". Furthermore, for example, in the example illustrated in FIG. 1, the first triple information FID11 indicates that the object is "<HOGE.inc>", i.e., a predetermined company "HOGE, Inc.". Namely, the example illustrated in FIG. 1 indicates the example in which the calculation device 100 calculates the statistical information related to, as a target, the first triple information FID11 that is associated with the specific meaning indicating that "Jim works at HOGE, Inc.". For example, the character string between "<" and ">" indicates a predetermined target.

First, as illustrated in FIG. 1, the calculation device 100 extracts the information related to a class of the first triple information that is the target (Step S11). In the example illustrated in FIG. 1, the calculation device 100 extracts the information related to the class of the first triple information FID11. For example, the calculation device 100 extracts, from the ontology information storage unit 123, the information related to the class of the first triple information FID11.

In the ontology information storage unit 123 illustrated in FIG. 1, information related to the definition of each entity (substance) in a predetermined ontology (conceptual system) or the like is stored. For example, the ontology information storage unit 123 stores therein the information related to the definition of vocabularies in the conceptual system, such as so-called RDF schema, or the like. Furthermore, the ontology information storage unit 123 illustrated in FIG. 1 corresponds to the ontology information storage unit 123 illustrated in FIG. 6 and only the portion related to the description of FIG. 1 is illustrated. In the example illustrated in FIG. 1, in order to illustrate only the portion related to the description, two ontology information storage units 123-1 and 123-2 are illustrated; however, it is assumed that the ontology information storage units 123-1 and 123-2 illustrated in FIG. 1 are the same ontology information storage unit 123. Furthermore, the ontology information storage units 123-1 and 123-2 are referred to as the ontology information storage unit 123 if both need not be distinguished.

For example, the ontology information storage unit 123 illustrated in FIG. 1 includes items, such as "ontology ID", "Subject", "Predicate", "Object", and the like.

Furthermore, the ontology information TID501 identified by the ontology ID "TID501" indicated in the ontology information storage unit 123-1 illustrated in FIG. 1 indicates that the subject is "<Jim>". Furthermore, for example, the ontology information TID501 indicated in the ontology information storage unit 123-1 illustrated in FIG. 1 indicates that the predicate is "rdf:type", i.e., a predetermined property. For example, this indicates that the predicate "rdf:type" is the instance of the class in which the value associated with the subject is associated with the object. Furthermore, for example, the ontology information TID501 indicated in the ontology information storage unit 123-1 illustrated in FIG. 1 indicates that the object is "<ceo>", i.e., a CEO. In this way, in the example illustrated in FIG. 1, the ontology information TID501 defines "<Jim>" as the instance of "<ceo>", i.e., "Jim is a CEO".

Furthermore, the ontology information TID502 identified by the ontology ID "TID502" indicated in the ontology information storage unit 123-1 illustrated in FIG. 1 indicates that the subject is "<Jim>". Furthermore, for example, the ontology information TID502 indicated in the ontology information storage unit 123-1 illustrated in FIG. 1 indicates that the predicate is "rdf:type". Furthermore, for example, the ontology information TID502 indicated in the ontology information storage unit 123-1 illustrated in FIG. 1 indicates that the object is "<father>", i.e., a father. In this way, in the example illustrated in FIG. 1, the ontology information TID502 defines "<Jim>" as the instance of "<father>", i.e., "Jim is a father".

Furthermore, the ontology information TID505 identified by the ontology ID "TID505" indicated in the ontology information storage unit 123-1 illustrated in FIG. 1 indicates that the subject is "<HOGE.inc>". Furthermore, for example, the ontology information TID505 indicated in the ontology information storage unit 123-1 illustrated in FIG. 1 indicates that the predicate is "rdf:type". Furthermore, for example, the ontology information TID505 indicated in the ontology information storage unit 123-1 illustrated in FIG. 1 indicates that the object is "<commercial company>", i.e., a commercial company corporation. In this way, in the example illustrated in FIG. 1, the ontology information TID505 defines "<HOGE.inc>" as the instance of "<commercial company>", i.e., "HOGE, Inc. is a commercial company corporation". Furthermore, the full width space in this application may also be replaced by a half width.

As described above, in a case where the "ontology information TID* (* is an arbitrary numerical value)" is described, the subject ontology information indicates the triple information identified by the ontology ID "TID*". For example, in a case where the "ontology information TID502" is described, the subject triple information is the triple information that is identified by the ontology ID "TID502".

Furthermore, an object (hereinafter, also referred to as a "term") included in the ontology information stored in the ontology information storage unit 123 has a graph structure indicating a hierarchical conceptual system indicated by graph information ON11 and graph information ON21 illustrated in FIG. 1. Furthermore, any object may also be used for the term mentioned here as long as the object is a conceptual linguistic representation and any object may also be used regardless of, for example, an abstract object, a concrete object, a part of speech associated with the subject linguistic representation, or the like. Furthermore, for example, the "term" mentioned here is defined as a "Universal Resource Identifier (URI)" in the RDF data model. For example, in the RDF data model, uniqueness in the Semantic Web technology is implemented by associating an identifier (mechanical address, etc.) with each of the concept. Nodes ND101 to ND113 indicated in the graph information ON11 illustrated in FIG. 1 and nodes ND201 to ND212 indicated in the graph information ON21 are associated with each of the terms of the ontology information stored in the ontology information storage unit 123. Hereinafter, the nodes ND101 to ND113 and the nodes ND201 to ND212 are referred to as the "node ND" if they need not be distinguished.

Furthermore, in FIG. 1, graph information ON11 indicating the graph structure in which the search related to the subject "<Jim>" is performed and the graph information ON21 indicating the graph structure in which the search related to the object "<HOGE.inc>" is performed are separately illustrated; however, the pieces of the graph information ON11 and ON21 are part of the conceptual system constituted based on the ontology information stored in the ontology information storage unit 123. Namely, a common node ND may also be included in both the graph information ON11 and the graph information ON21 or the nodes ND in the graph information ON11 and the nodes ND in the graph information ON21 may also be connected by arrows.

Each of the arrow lines that connects between each of the nodes ND indicated by the graph information ON11 and the graph information ON21 illustrated in FIG. 1 indicates that a relationship of a higher level class and a lower level class is present between the terms associated with the connected nodes. Specifically, the term associated with the node on the side of the starting point of the arrow line indicates the lower level class and the term associated with the node on the side of the arrowhead indicates the higher level class. For example, the graph information ON11 indicates that the term "<person>" associated with the node ND110 is the higher level class of the term "<employee>" associated with the node ND113. Furthermore, in FIG. 1, a description of "< >" will be appropriately omitted. Furthermore, only a part of the nodes ND needed for a description is illustrated in the graph information ON11 and the graph information ON21 in FIG. 1. For example, in the node ND110 associated with the term "<person>", the nodes ND associated with various kinds of lower level classes (lower level concepts) other than the two nodes ND, i.e., the nodes ND109 and ND113, may also be included.

For example, the ontology information TID231 stored in the ontology information storage unit 123 (see FIG. 6) indicates that the subject is "<employee>", i.e., an employee. Furthermore, for example, the ontology information TID231 indicates that the predicate is "rdfs:subClassOf", i.e., a predetermined property. For example, the predicate "rdfs:subClassOf" indicates that the value associated with the subject is a member of the class associated with the object, i.e., a subclass (lower level class). Furthermore, for example, the ontology information TID231 indicates that the object is "<person>". Namely, the ontology information TID231 indicates that "<employee>" is the lower level class of "<person>". In other words, the ontology information TID231 indicates that an "employee" is the lower level concept of a "human".

For example, the calculation device 100 extracts, based on the ontology information TID231 described above, the relationship of the arrow in which the node ND113 associated with the term "<employee>" in the graph information ON11 is the starting point and the node ND110 associated with the term "<person>" is the arrowhead.

Furthermore, for example, the ontology information TID201 stored in the ontology information storage unit 123 (see FIG. 6) indicates that the subject is "<ceo>", i.e., a CEO. Furthermore, for example, the ontology information TID201 indicates that the predicate is "rdfs:subClassOf". Furthermore, for example, the ontology information TID201 indicates that the object is "<officer>", i.e., an officer. Namely, the ontology information TID201 indicates that "<ceo>" is the lower level class of "<officer>". In other words, the ontology information TID231 indicates that an "CEO" is the lower level concept of a "officer".

For example, the calculation device 100 extracts, based on the ontology information TID201 described above, the relationship of the arrow in which the node ND103 associated with the term "<ceo>" in the graph information ON11 is the starting point and the node ND108 associated with the term "<officer>" is the arrowhead. In this way, the calculation device 100 extracts, based on the ontology information stored in the ontology information storage unit 123, the graph structure indicated in the graph information ON11 or the graph information ON21.

In the example illustrated in FIG. 1, the calculation device 100 extracts the ontology information in which the subject "<Jim>" of the first triple information FID11 is the subject and the predicate is "rdf:type" from the ontology information storage unit 123. Furthermore, in the example illustrated in FIG. 1, the calculation device 100 extracts the ontology information in which the object "<HOGE.inc>" of the first triple information FID11 is the subject and the predicate is "rdf:type" from the ontology information storage unit 123. Specifically, the calculation device 100 extracts the pieces of the ontology information TID501, TID502, TID505, and the like from the ontology information storage unit 123.

For example, the calculation device 100 specifies that "<Jim>" is the instance of "<ceo>" based on the extracted ontology information TID501. Consequently, the calculation device 100 extracts the information indicating that "<ceo>" is the class of "<Jim>" from the ontology information storage unit 123. Furthermore, for example, the calculation device 100 specifies that "<Jim>" is the instance of "<father>" based on the extracted ontology information TID502. Consequently, the calculation device 100 extracts the information indicating that "<father>" is the class of "<Jim>" from the ontology information storage unit 123. Furthermore, although not illustrated, the calculation device 100 specifies, based on another piece of extracted ontology information, for example, "<American>", i.e., an American, is the class of "<Jim>", or the like.

The calculation device 100 extracts the node ND associated with the information related to the class of "<Jim>". In the example illustrated in FIG. 1, the calculation device 100 extracts the node ND associated with "<ceo>", "<father>", or the like that is the class of "<Jim>". In the example illustrated in FIG. 1, as indicated in an area AR11 in the graph information ON11, the calculation device 100 extracts four nodes ND101 to ND104 including the node ND103 that is associated with the term "<ceo>" and the node ND102 that is associated with the term "<father>".

Furthermore, for example, the calculation device 100 specifies that "<HOGE.inc>" is the instance of "<commercial company>" based on the extracted ontology information TID505. Consequently, the calculation device 100 extracts the information indicating that "<commercial company>" is the class of "<HOGE.inc>" from the ontology information storage unit 123.

The calculation device 100 extracts the node ND associated with the information related to the class of "<HOGE.inc>". In the example illustrated in FIG. 1, the calculation device 100 extracts the node ND associated with, for example, "<commercial company>" that is the class of "<HOGE.inc>". In the example illustrated in FIG. 1, as indicated in an area AR21 in the graph information ON21, the calculation device 100 extracts four nodes ND201 to ND204 including the node ND201 that is associated with the term "<commercial company>".

Then, the calculation device 100 extracts the information related to the class of "<Jim>" by tracing the higher level class from the four nodes ND101 to ND104 in the graph information ON11. Furthermore, the calculation device 100 extracts the information related to the class of "<HOGE.inc>" by tracing the higher level class from the four nodes ND201 to ND204 in the graph information ON21.

Here, the calculation device 100 extracts, from the ontology information storage unit 123, the information that is used to specify the region of a search performed starting from the four nodes ND101 to ND104 in the graph information ON11 or the four nodes ND201 to ND204 in the graph information ON21 (Step S12). In the example illustrated in FIG. 1, the calculation device 100 extracts, based on the predicate "<worksAt>" in the first triple information FID11, information that is used to specify the region of a search performed starting from the four nodes ND101 to ND104 in the graph information ON11 or the four nodes ND201 to ND204 in the graph information ON21.

For example, as indicated by the ontology information storage unit 123-2 illustrated in FIG. 1, the ontology information TID101 indicates that the subject is "<worksAt>". Furthermore, for example, the ontology information TID101 indicates that the predicate is "rdfs:domain", i.e., a predetermined property indicating a domain. In this case, the predicate "rdfs:domain" indicates the class that can be the subject of "<worksAt>". Furthermore, for example, the ontology information TID101 indicates that the object is "<person>", i.e., a human. Namely, the ontology information TID101 indicates that the classes lower than the class "<person>" can be the subject of "<worksAt>". Namely, as the subject of "<worksAt>", the term "<person>" is the top level concept. Furthermore, a plurality of pieces of the ontology information in which the subject is "<worksAt>" and the predicate is "rdfs:domain", i.e., a plurality of pieces of the ontology information indicating the domain of "<worksAt>" may also be present.

Consequently, the calculation device 100 decides the region of a search performed starting from the four nodes ND101 to ND104 in the graph information ON11 is up to the node ND110 associated with the term "<person>". Namely, the calculation device 100 extracts the term that is associated with the nodes ND located in a region from the four nodes ND101 to ND104 in the graph information ON11 up to the node ND110 associated with the term "<person>" as the information related to the class of the term "<Jim>" (Step S13).

In the example illustrated in FIG. 1, because it is possible to reach the node ND110 from the nodes ND103 and ND104, the nodes ND included in a region from the nodes ND103 and ND104 up to the node ND110 become the target nodes to be extracted as the information related to the class of the term "<Jim>". Specifically, the eight nodes ND of the nodes ND103, ND104, and ND108 to ND113 become the target nodes to be extracted as the information related to the class of the term "<Jim>". Furthermore, in the example illustrated in FIG. 1, the calculation device 100 extracts, as the calculation target of the statistical information, the classes down to the second highest classes from the node ND110 associated with the term "<person>" that is the top level concept.

Namely, in the example illustrated in FIG. 1, the calculation device 100 extracts the terms associated with the five nodes ND of the nodes ND108 to ND110, ND112, and ND113 as the calculation target of the statistical information. Furthermore, the node ND extracted as being associated with the subject of the target triple information is sometimes referred to as a "first element". Specifically, the calculation device 100 uses the five terms, i.e., the term "<officer>" associated with the node ND108, the term "<owner>" associated with the node ND109, the term "<person>" associated with the node ND110, the term "<engineer>" associated with the node ND112, and the term "<employee>" associated with the node ND113, as the calculation target of the statistical information.

Furthermore, in the example illustrated in FIG. 1, because it is not possible to reach the node ND110 from the nodes ND101 and ND102, the nodes ND101 and ND102 and the nodes ND105 to ND107, which are associated with the classes of the higher level of the node ND102, are not extracted as the information related to the class of the term "<Jim>". Furthermore, in the graph information ON11, the node associated with the class higher than that of the node ND110 that is associated with the term "<person>" may also be included.

Furthermore, for example, as indicated by the ontology information storage unit 123-2 illustrated in FIG. 1, the ontology information TID102 indicates that the subject is "<worksAt>". Furthermore, for example, the ontology information TID102 indicates that the predicate is "rdfs:range", i.e., a predetermined property that indicates the range. In this case, the predicate "rdfs:range" indicates the class that can be the object of "<worksAt>". Furthermore, for example, the ontology information TID102 indicates that the object is "<organization>", i.e., an organization. Namely, the ontology information TID102 indicates that the classes lower than the class "<organization>" can become the object of "<worksAt>". Namely, it is indicated that, as the object of "<worksAt>", the term "<organization>" is the top level concept. Furthermore, a plurality of pieces of the ontology information in which the subject is "<worksAt>" and the predicate is "rdfs:range", i.e., a plurality of pieces of the ontology information indicating the range of "<worksAt>" may also be present.

Consequently, the calculation device 100 decides the region of a search performed starting from the four nodes ND201 to ND204 in the graph information ON21 is up to the node ND207 associated with the term "<organization>". Namely, the calculation device 100 extracts the term associated with the nodes ND located in a region from the four nodes ND201 to ND204 in the graph information ON21 up to the node ND207 associated with the term "<organization>" as the information related to the class of "<HOGE.inc>" (Step S14).

In the example illustrated in FIG. 1, because it is possible to reach the node ND207 from the node ND201, the nodes ND included in a region from the node ND201 up to the node ND207 become the target nodes to be extracted as the information related to the class of the term "<organization>". Specifically, the four nodes ND of the nodes ND201 and ND205 to ND207 become the target nodes to be extracted as the information related to the class of the term "<organization>". Furthermore, in the example illustrated in FIG. 1, the calculation device 100 extracts, as the calculation target of the statistical information, the classes down to the second highest classes from the node ND207 associated with the term "<organization>" that is the top level concept.

Namely, in the example illustrated in FIG. 1, the calculation device 100 extracts the terms associated with the three nodes ND of the nodes ND205 to ND207 as the calculation target of the statistical information. Furthermore, the node ND extracted as being associated with the object of the target triple information is sometimes referred to as a "second element". Specifically, the calculation device 100 uses the three terms, i.e., the term "<company limited>" associated with the node ND205, the term "<company>" associated with the node ND206, and the term "<organization>" associated with the node ND207, as the calculation target of the statistical information.

Furthermore, in the example illustrated in FIG. 1, because it is not possible to reach the node ND207 from the nodes ND202 to ND204, the nodes ND202 to ND204 and the nodes ND208 to ND211, which are associated with the classes of the higher level of the node ND204, are not extracted as the information related to the class of the term "<organization>". Furthermore, in the graph information ON21, the node associated with the class higher than that of the node ND110 that is associated with the term "<organization>" may also be included.

Then, the calculation device 100 extracts a combination based on the extracted first elements and the extracted second elements (Step S15). In the example illustrated in FIG. 1, the calculation device 100 extracts the combination based on the nodes ND108 to ND110, ND112, and ND113 that which are the first elements and based on the nodes ND205 to ND207 that are the second elements. Specifically, the calculation device 100 extracts the combination that can be obtained in a case where each of the first elements is the subject, the term "<worksAt>" is the predicate, and each of the second elements is the object.

In the example illustrated in FIG. 1, the calculation device 100 extracts the combination that can be obtained in a case where each of the terms associated with the five nodes of the nodes ND108 to ND110, ND112, and ND113 is the subject, the term "<worksAt>" is the predicate, and each of the terms associated with the three nodes of the nodes ND205 to ND207 is the object. Namely, the calculation device 100 extracts 15 (=5×3) types of combinations that are obtained in a case where each of the terms associated with the five nodes of the nodes ND108 to ND110, ND112, and ND113 is the subject, the term "<worksAt>" is the predicate, and each of the terms associated with the three nodes of the nodes ND205 to ND207 is the object. In the example illustrated in FIG. 1, the calculation device 100 extracts the combination indicated by the combination information CN21.

For example, as indicated by the combination information CN21, the calculation device 100 extracts the combination in which the subject is "<person>", the predicate is "<worksAt>", and the object is "<organization>". Furthermore, for example, as indicated by the combination information CN21, the calculation device 100 extracts the combination in which the subject is "<employee>", the predicate is "<worksAt>", and the object is "<organization>". Furthermore, the calculation device 100 also extracts the remaining 13 types of combinations. In RDF, a delimiter character " " (space) is normally used. But, in the embodiment, we use a delimiter character "," in place of the delimiter character " " (space) for visibility. So the delimiter character "," in the embodiment can also be replaced by the delimiter character " " (space). Furthermore, the meaning of the delimiter character "," in the embodiment may be different from a meaning of the delimiter character "," in conventional RDF.

Then, the calculation device 100 calculates the statistical information based on the extracted combinations (Step S16). In the example illustrated in FIG. 1, the calculation device 100 adds, based on the extracted combinations, the count values of the second triple information in the second triple information storage unit 122. For example, the second triple information is schema information indicating the conceptual classification structure based on the ontology information in the ontology information storage unit 123. For example, the second triple information is the information indicating the semantic conceptual structure (graph structure) between the pieces of the triple information based on the ontology information in the ontology information storage unit 123. Furthermore, extracting (creating) the second triple information will be described in detail later.

For example, the second triple information storage unit 122 illustrated in FIG. 1 includes items, such as "second triple ID", "Subject", "Predicate", "Object", and "statistical information". Furthermore, the second triple information storage unit 122 illustrated in FIG. 1 and the second triple information storage unit 122 illustrated in FIG. 5 are the same second triple information storage unit 122 and, in FIG. 1, an illustration of the item "hierarchy information" in the second triple information storage unit 122 is omitted.

The "second triple ID" indicates the identification information for identifying the triple information. Furthermore, the "Subject" indicates the value associated with the subject of the triple information that is identified by the second triple ID. Furthermore, the "Predicate" indicates the value associated with the predicate of the triple information that is identified by the second triple ID. Furthermore, the "Object" indicates the value associated with the object of the triple information that is identified by the second triple ID.

Furthermore, the "statistical information" includes the items, such as "hierarchy", "count value", and the like. For example, the "hierarchy" stores therein the hierarchy in the second triple information in the triple information that is identified by the second triple ID. For example, the "count value" stores therein the count value of the triple information identified by the second triple ID. For example, the "count value" stores therein the count value based on the number of pieces of the first triple information associated with the triple information that is identified by the second triple ID.

For example, in the example illustrated in FIG. 5, the second triple information storage unit 122 stores therein the triple information, such as the second triple information SID21 identified by the second triple ID "SID21", the second triple information SID41 identified by the second triple ID "SID41", and the like.

Furthermore, as described above, if the "second triple information SID* (* is an arbitrary numerical value)" is described, this indicates that the second triple information SID thereof is the triple information identified by the second triple information ID "SID*". For example, if the "second triple information SID22" is described, the triple information thereof is the triple information that is identified by the second triple ID "SID22".

For example, in the example illustrated in FIG. 1, the second triple information SID11 identified by the second triple ID "SID11" indicates that the subject is "<person>", i.e., a human. Furthermore, for example, the second triple information SID11 indicates that the predicate is "<worksAt>", i.e., the predicate having the meaning of "works at".

Furthermore, for example, the second triple information SID11 indicates that the object is "<organization>", i.e., an organization. In this way, the second triple information SID11 indicates abstract meaning indicating that "a human works at an organization".

For example, in the example illustrated in FIG. 1, the second triple information SID41 identified by the second triple ID "SID41" indicates that the subject is "<engineer>", i.e., an engineer. Furthermore, for example, the second triple information SID41 indicates that the predicate is "<worksAt>", i.e., the predicate having the meaning of "works at". Furthermore, for example, the second triple information SID41 indicates that the object is "<company>", i.e., a company. In this way, the second triple information SID41 indicates abstract meaning indicating that "an engineer works as a company".

In the example illustrated in FIG. 1, the calculation device 100 increments the count value associated with the second triple information in the second triple information storage unit 122 associated with each of the combinations included in the combination information CN21 by 1.

For example, the calculation device 100 increments the count value of the second triple information SID11 associated with the combination in which the subject of the combination information CN21 is "<person>", the predicate thereof is "<worksAt>", and the object thereof is "<organization>" by 1. In the example illustrated in FIG. 1, the calculation device 100 increments the count value of the second triple information SID11 associated with the combination in which the subject of the combination information CN21 is "<person>", the predicate thereof is "<worksAt>", and the object thereof is "<organization>" from "9999" to "100000".

Furthermore, for example, the calculation device 100 increments the count value of the second triple information SID41 associated with the combination in which the subject of the combination information CN21 is "<engineer>", the predicate thereof is "<worksAt>", and the object thereof is "<company>" by 1. In the example illustrated in FIG. 1, the calculation device 100 increments the count value of the second triple information SID41 associated with the combination in which the subject of the combination information CN21 is "<engineer>", the predicate thereof is "<worksAt>", and the object thereof is "<company>" from "799" to "800".

By performing the process described above on each of the pieces of the first triple information stored in the first triple information storage unit 121, the calculation device 100 calculates the statistical information related to the first triple information group stored in the first triple information storage unit 121. For example, by also performing the process described above on the first triple information FID21, the pieces of the first triple information FID201 and FID1105 (see FIG. 4), or the like in which the subject is "<Jim>", the predicate is "<hasAge>", and the object is "32", the calculation device 100 calculates the statistical information related to the first triple information group stored in the first triple information storage unit 121.

As described above, the calculation device 100 calculates the statistical information related to the first triple information based on the number of pieces of the first triple information associated with each of the pieces of the second triple information. In this way, by creating the statistical information indicating the tendency of the first triple information included in the first triple information group based on the second triple information related to a predetermined conceptual system, the calculation device 100 can statistically enable the conceptual system in the plurality of pieces of triple information to be grasped. Furthermore, the calculation device 100 may also provide the created statistical information to a terminal device 10 (see FIG. 2). For example, the statistical information related to the first triple information calculated by the calculation device 100 can be used in a case where the first triple information is stored in a distributed manner. For example, by storing, based on the statistical information related to the calculated first triple information, the first triple information in a plurality of storage devices in a distributed manner in accordance with the hierarchical relationship of the second triple information, the calculation device 100 can store the first triple information associated with the similar concept in the same storage device. Furthermore, in the example described above, a case in which the predicate is "<worksAt>" has been described as an example; however, if the ontology information related to the hierarchical structure, such as higher level concept (higher level class), the lower level concept (lower level class), or the like, is present in the predicate, the calculation device 100 may also calculate the statistical information by performing the same process as that described above on the predicate. For example, if the term "<belongsTo>" is defined as the higher level concept of the term "<worksAt>" that is the predicate and if the term "<studiesAt>" (studies at) is defined in addition to the term "<worksAt>" as the lower level concept of the term "<belongsTo>", the calculation device 100 may also calculate the statistical information based on this conceptual system. For example, regarding the term "<belongsTo>", the calculation device 100 may also calculate the statistical information by calculating the count value based on the first triple information associated with the term "<worksAt>" that is the lower level concept or based on the first triple information associated with the term "<studiesAt>".

2. Configuration of the Calculation System

Figure 2:
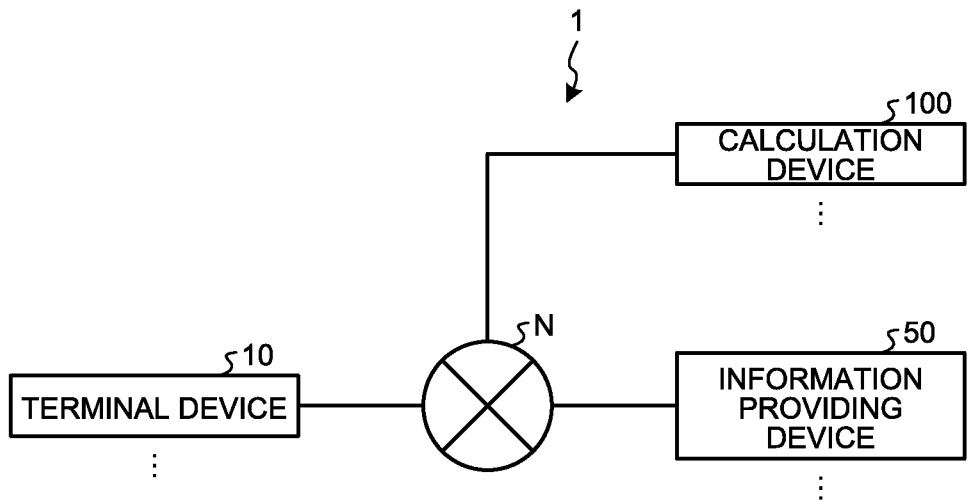
FIG. 2 is a diagram illustrating a configuration example of a calculation system according to the embodiment.

As illustrated in FIG. 2, a calculation system 1 includes the terminal device 10, an information providing device 50, and the calculation device 100. The terminal device 10, the information providing device 50, and the calculation device 100 are connected via a predetermined network N such that the devices can be communicated with each other in a wired or wireless manner. FIG. 2 is a diagram illustrating a configuration example of a calculation system according to the embodiment.

Furthermore, in the calculation system 1 illustrated in FIG. 2, a plurality of the terminal devices 10, a plurality of the information providing devices 50, and a plurality of the calculation devices 100 may also be included.

The terminal device 10 is an information processing apparatus used by a user. The terminal device 10 receives various kinds of operations performed by the user. In a description below, the terminal device 10 is sometimes referred to as a user. Namely, in a description below, a user can also be read as the terminal device 10. Furthermore, the terminal device 10 described above can be implemented by, for example, a smartphone, a tablet terminal, a notebook personal computer (PC), a desktop PC, a mobile phone, a personal digital assistance (PDA), or the like.

The information providing device 50 is an information processing apparatus that stores therein the triple information based on the character information or the like collected from various kinds of external devices, such as web servers, or the like. For example, the information providing device 50 creates the triple information based on the information related to the resources collected from various kinds of external devices, such as web servers, or the like. Furthermore, for example, the information providing device 50 provides the first triple information, the second triple information, and the ontology information to the calculation device 100.

The calculation device 100 is an information processing apparatus that calculates the statistical information related to a plurality of the first triple information based on the number of the pieces of the first triple information associated with each of the plurality of pieces of the second triple information. Furthermore, in the embodiment, the calculation device 100 provides the statistical information related to the first triple information to the terminal device 10. Furthermore, the calculation device 100 may also create triple information based on the information related to the resources collected from various kinds of external devices, such as web servers, or the like. For example, the calculation device 100 may also create the first triple information, the second triple information, and the ontology information based on the information related to the resources collected from various kinds of external devices, such as web servers, or the like.

3. Configuration of the Calculation Device

Figure 3:
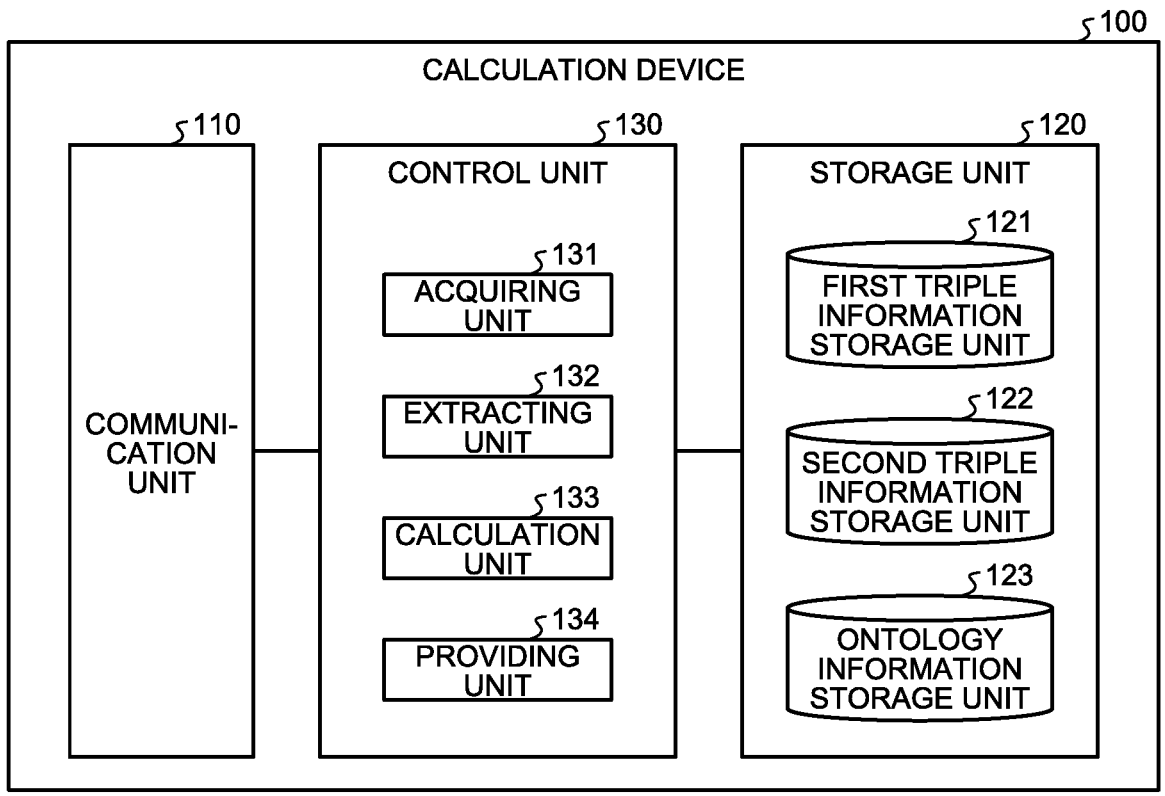
FIG. 3 is a diagram illustrating a configuration example of a calculation device according to the embodiment.

In the following, the configuration of the calculation device 100 according to the embodiment will be described with reference to FIG. 3. FIG. 3 is a diagram illustrating a configuration example of the calculation device 100 according to the embodiment. As illustrated in FIG. 3, the calculation device 100 includes a communication unit 110, a storage unit 120, and a control unit 130. Furthermore, the calculation device 100 may also include an input unit (for example, a keyboard, a mouse, or the like) that receives various kinds of operations from an administrator of the calculation device 100 or a displaying unit (for example, a liquid crystal display, or the like) that displays various kinds of information.

Communication Unit 110

The communication unit 110 is implemented by, for example, a network interface card (NIC), or the like. Furthermore, the communication unit 110 is connected to a network (for example, the network N illustrated in FIG. 2) in a wired or wireless manner and sends and receives information to and from the terminal device 10.

Storage Unit 120

The storage unit 120 is implemented by, for example, a semiconductor memory device, such as a random access memory (RAM), a flash memory, or the like, or a storage device, such as a hard disk, an optical disk, or the like. The storage unit 120 according to the embodiment includes, as illustrated in FIG. 3, the first triple information storage unit 121, the second triple information storage unit 122, and the ontology information storage unit 123.

First Triple Information Storage Unit 121

The first triple information storage unit 121 according to the embodiment stores therein various kinds of information related to the triple. For example, the first triple information storage unit 121 stores therein triple information or association information. FIG. 4 is a diagram illustrating an example of the first triple information storage unit according to the embodiment. The first triple information storage unit 121 illustrated in FIG. 4 includes the items, such as "first triple ID", "Subject", "Predicate", "Object", and the like.

The "first triple ID" indicates the identification information for identifying the triple information. The "Subject" indicates the value associated with the subject of the triple information identified by the first triple ID. The "Predicate" indicates the value associated with the predicate of the triple information identified by the first triple ID. The "Object" is a value associated with the object of the triple information identified by the first triple ID.

For example, in the example illustrated in FIG. 4, the first triple information storage unit 121 stores therein a large number of pieces of (for example, billions, tens of billions, etc.) triple information, such as the first triple information FID11 identified by the first triple ID "FID11", the first triple information FID1105 identified by the first triple ID "FID1105", or the like.

For example, in the example illustrated in FIG. 4, the first triple information FID11 identified by the first triple ID "FID11" indicates that the subject is "<Jim>", i.e., a predetermined human "Jim". Furthermore, for example, in the example illustrated in FIG. 4, the first triple information FID11 indicates that the predicate is "<worksAt>", i.e., the predicate having the meaning of "works at". Furthermore, for example, in the example illustrated in FIG. 4, the first triple information FID11 indicates that the object is "<HOGE.inc>", i.e., a predetermined company "HOGE, Inc.". In this way, in the example illustrated in FIG. 4, the first triple information FID11 is the triple information associated with the specific meaning indicating that "Jim works at HOGE, Inc.".

Furthermore, for example, in the example illustrated in FIG. 4, the first triple information FID21 identified by the first triple ID "FID21" indicates that the subject is "<Jim>". Furthermore, for example, in the example illustrated in FIG. 4, the first triple information FID21 indicates that the predicate is "<hasAge>", i.e., the predicate having the meaning of "years old". Furthermore, for example, in the example illustrated in FIG. 4, the first triple information FID11 indicates that the object is "32", i.e., the numerical value "32". In this way, in the example illustrated in FIG. 4, the first triple information FID21 is the triple information associated with the specific meaning indicating that "Jim is 32 years old".

Furthermore, the first triple information storage unit 121 is not limited to the unit described above and may also store therein various kinds of information in accordance with purposes. For example, the first triple information storage unit 121 may also store therein the triple information associated with abstract meaning. For example, the first triple information storage unit 121 may also store therein a predetermined property in the "Subject", the "Predicate", or the "Object".

Second Triple Information Storage Unit 122 the second triple information storage unit 122 according to the embodiment stores therein various kinds of information that are used to refer to the triple information stored in the first triple information storage unit 121. FIG. 5 is a diagram illustrating an example of the second triple information storage unit according to the embodiment. The second triple information storage unit 122 illustrated in FIG. 5 includes items, such as "second triple ID", "Subject", "Predicate", "Object", "hierarchy information", "statistical information", and the like.

The "second triple ID" indicates the identification information for identifying the triple information. The "Subject" indicates the value associated with the subject of the triple information identified by the second triple ID. The "Predicate" indicates the value associated with the predicate of the triple information identified by the second triple ID. The "Object" indicates the value associated with the object of the triple information identified by the second triple ID.

Furthermore, the "hierarchy information" includes items, such as "higher level 1", "higher level 2", and the like. For example, the "higher level 1" or the "higher level 2" stores therein the information that identifies the triple information associated with the higher level concept (higher level class) of the triple information identified by the second triple ID. Furthermore, in FIG. 5, only the "higher level 1" and the "higher level 2" are illustrated; however, a "higher level 3", a "higher level 4", or the like may also be included so as to store all of the pieces of the triple information associated with the higher level class of the triple information.

Furthermore, the "statistical information" includes items, such as "hierarchy", "count value", and the like. For example, in the "hierarchy", the hierarchy in the second triple information of the triple information identified by the second triple ID is stored. For example, the "count value" stores therein the count value of the triple information identified by the second triple ID. For example, the "count value" stores therein count value that is based on the number of pieces of the first triple information associated with the triple information identified by the second triple ID.

For example, in the example illustrated in FIG. 5, the second triple information storage unit 122 stores therein triple information, such as the second triple information SID21 identified by the second triple ID "SID21", the second triple information SID41 identified by the second triple ID "SID41", and the like.

For example, in the example illustrated in FIG. 5, the second triple information SID11 identified by the second triple ID "SID11" indicates that the subject is "<person>", i.e., a human. Furthermore, for example, in the example illustrated in FIG. 5, the second triple information SID11 indicates that the predicate is "<worksAt>", i.e., the predicate having the meaning of "works at". Furthermore, for example, in the example illustrated in FIG. 5, the second triple information SID11 indicates that the object is "<organization>", i.e., an organization. In this way, in the example illustrated in FIG. 5, the second triple information SID11 is the triple information associated with the abstract meaning indicating that "a human works at an organization".

For example, in the example illustrated in FIG. 5, the second triple information SID41 identified by the second triple ID "SID41" indicates that the subject is "<engineer>", i.e., an engineer. Furthermore, for example, in the example illustrated in FIG. 5, the second triple information SID41 indicates that the predicate is "<worksAt>", i.e., the predicate having the meaning of "works at". Furthermore, for example, in the example illustrated in FIG. 5, the second triple information SID41 indicates that the object is "<company>", i.e., a company. In this way, in the example illustrated in FIG. 5, the second triple information SID41 is the triple information associated with the abstract meaning indicating that "an engineer works at a company".

Furthermore, the second triple information storage unit 122 is not limited to the unit described above and may also store therein various kinds of information in accordance with purposes. For example, the second triple information storage unit 122 may also store therein the triple information associated with specific meaning. For example, the second triple information storage unit 122 may also store therein a predetermined property in the "Subject", the "Predicate", or the "Object". Furthermore, for example, the second triple information storage unit 122 may also include, in the "hierarchy information", the item indicating the lower level concept (lower level class) associated with the triple information, such as the "lower level 1", the "lower level 2", or the like.

Ontology Information Storage Unit 123

The ontology information storage unit 123 according to the embodiment stores therein various kinds of information related to a predetermined conceptual system (ontology). For example, the ontology information storage unit 123 stores therein the information related to the definition of each of the entity (substance). FIG. 6 is a diagram illustrating an example of the ontology information storage unit according to the embodiment. The ontology information storage unit 123 illustrated in FIG. 6 includes items, such as "ontology ID", "Subject", "Predicate", "Object", and the like.

The "ontology ID" indicates the identification information for identifying the triple information. The "Subject" indicates the value associated with the subject of the triple information identified by the ontology ID. The "Predicate" indicates the value associated with the predicate of the triple information identified by the ontology ID. The "Object" indicates the value associated with the object of the triple information identified by the ontology ID.

For example, in the example illustrated in FIG. 6, the ontology information TID101 identified by the ontology ID "TID101" indicates that the subject is "<worksAt>". Furthermore, for example, in the example illustrated in FIG. 6, the ontology information TID101 indicates that the predicate is "rdfs:domain", i.e., a predetermined property indicating a domain. In this case, the predicate "rdfs:domain" indicates the class that can be the subject of "<worksAt>". Furthermore, for example, in the example illustrated in FIG. 6, the ontology information TID101 indicates that the object is "<person>", i.e., a human. In this way, in the example illustrated in FIG. 6, the ontology information TID101 defines the classes lower than the class "<person>" as the class that can be the subject of "<worksAt>".

For example, in the example illustrated in FIG. 6, the ontology information TID102 identified by the ontology ID "TID102" indicates that the subject is "<worksAt>". Furthermore, for example, in the example illustrated in FIG. 6, the ontology information TID102 indicates that the predicate is "rdfs:range", i.e., a predetermined property indicating the range. In this case, the predicate "rdfs:range" indicates the class that can be the object of "<worksAt>". Furthermore, for example, in the example illustrated in FIG. 6, the ontology information TID102 indicates that the object is "<organization>", i.e., an organization. In this way, in the example illustrated in FIG. 6, the ontology information TID102 defines the classes lower than the class "<organization>" as the class that can be the object of "<worksAt>".

Furthermore, for example, in the example illustrated in FIG. 6, the ontology information TID201 identified by the ontology ID "TID201" indicates that the subject is "<ceo>", i.e., a CEO. Furthermore, for example, in the example illustrated in FIG. 6, the ontology information TID201 indicates that the predicate is "rdfs:subClassOf", i.e., a predetermined property. For example, the predicate "rdfs:subClassOf" indicates that the value associated with the subject is the member of the class associated with the object, i.e., a subclass (lower level class). Furthermore, for example, in the example illustrated in FIG. 6, the ontology information TID201 indicates that the object is "<officer>", i.e., an officer. In this way, in the example illustrated in FIG. 6, the ontology information TID201 defines "<officer>" as the lower level class (lower level concept) of "<ceo>".

Furthermore, for example, in the example illustrated in FIG. 6, the ontology information TID501 identified by the ontology ID "TID501" indicates that the subject is "<Jim>", i.e., a predetermined human "Jim". Furthermore, for example, in the example illustrated in FIG. 6, the ontology information TID501 indicates that the predicate is "rdf:type", i.e., a predetermined property. For example, the predicate "rdf:type" indicates that the value associated with the subject is the instance of the class associated with the object. Furthermore, for example, in the example illustrated in FIG. 6, the ontology information TID501 indicates that the object is "<ceo>", i.e., a CEO. In this way, in the example illustrated in FIG. 6, the ontology information TID501 defines "<Jim>" as the instance of "<ceo>", i.e., "Jim is a CEO".

Furthermore, the ontology information storage unit 123 is not limited to the unit described above and may also store therein various kinds of information in accordance with purposes. For example, the ontology information storage unit 123 may also store therein the triple information associated with specific meaning.

Control Unit 130

A description will be given here by referring back to FIG. 3. The control unit 130 is a controller and is implemented by, for example, a central processing unit (CPU), a micro processing unit (MPU), or the like, executing various kinds of programs (corresponding to an example of a calculation program), which are stored in a storage device in the calculation device 100, by using a RAM as a work area. Furthermore, the control unit 130 is a controller and is implemented by, for example, an integrated circuit, such as an application specific integrated circuit (ASIC), a field programmable gate array (FPGA), or the like.

As illustrated in FIG. 3, the control unit 130 includes an acquiring unit 131, an extracting unit 132, a calculation unit 133, and a providing unit 134 and implements or executes the function or the operation of the information processing described below. Furthermore, the internal configuration of the control unit 130 is not limited to the configuration illustrated in FIG. 3 and another configuration may also be used as long as the configuration in which the information processing described below is performed.

Acquiring Unit 131

The acquiring unit 131 acquires various kinds of information. For example, the acquiring unit 131 acquires various kinds of information from the first triple information storage unit 121, the second triple information storage unit 122, the ontology information storage unit 123, and the like. Furthermore, the acquiring unit 131 may also acquire various kinds of information from an external information processing apparatus. Furthermore, the acquiring unit 131 may also acquire information related to each of the pieces of the triple information from the information providing device 50.

For example, the acquiring unit 131 acquires a plurality of pieces of the first triple information related to three types of elements, a plurality of pieces of the second triple information based on the conceptual system in a plurality of pieces of the first triple information. For example, the acquiring unit 131 acquires a plurality of pieces of the first triple information from the first triple information storage unit 121. Furthermore, for example, the acquiring unit 131 acquires a plurality of pieces of the second triple information from the second triple information storage unit 122. For example, the acquiring unit 131 acquires a plurality of pieces of the second triple information hierarchized based on the information related to a predetermined conceptual system.

Extracting Unit 132

The extracting unit 132 extracts various kinds of information. For example, the extracting unit 132 extracts triple information. For example, the extracting unit 132 extracts the triple information group associated with the information related to the designation of the element acquired by the acquiring unit 131. For example, the extracting unit 132 extracts the triple information group related to the designation related to one or more elements out of the three types of elements.

For example, the extracting unit 132 extracts, based on the ontology information, each of the first elements included in a region from each of the classes up to the domain. For example, the extracting unit 132 extracts, based on the ontology information, each of the second elements included in a region from each of the classes up to the range.

Calculation Unit 133

The calculation unit 133 calculates various kinds of information. For example, the calculation unit 133 calculates the statistical information related to a plurality of pieces of the first triple information acquired by the acquiring unit 131. For example, the calculation unit 133 calculates, based on the number of the pieces of the first triple information associated with each of the plurality of pieces of the second triple information, the statistical information related to a plurality of pieces of the first triple information.

For example, the calculation unit 133 calculates the statistical information by using the second triple information indicating the relationship related to the three types of elements that are each of classes or higher level classes of the three types of elements in one of the pieces of the first triple information as the second triple information associated with one of the pieces of the first triple information. Furthermore, for example, the calculation unit 133 calculates the statistical information by using the second triple information indicating the relationship related to the three types of elements that are the class of one of the elements in one of the pieces of the first triple information and that are each of the classes or higher level classes of the other two elements as the second triple information associated with the one of the pieces of the first triple information.

For example, the calculation unit 133 calculates the statistical information by using the second triple information indicating the relationship related to the three types of elements that are the class of the element of a predicate of one of the pieces of the first triple information and that are each of the classes or the higher level classes of the elements of a subject and an object as the second triple information associated with the one of the pieces of the first triple information. For example, the calculation unit 133 calculates the statistical information by using, based on the third triple information indicating the domain and the range related to the predicate of one of the pieces of the first triple information, the second triple information in which the element of the subject is included between the class of the subject of one of the pieces of the first triple information and the domain and the element of the object is included between the class of the object of one of the pieces of the first triple information as the second triple information associated with one of the pieces of the first triple information.

For example, the calculation unit 133 calculates the statistical information related to the plurality of pieces of the first triple information based on a plurality of nodes that includes the node associated with the element of the subject of one of the pieces of the first triple information and based on each of the nodes included from the node associated with the element of the subject up to the node associated with the domain from among the plurality of nodes connected in accordance with the hierarchical relationship between each of the nodes. Furthermore, for example, the calculation unit 133 calculates the statistical information related to the plurality of pieces of the first triple information based on the nodes included from the node associated with the domain up to the node at a predetermined number of stages from among the nodes.

For example, the calculation unit 133 calculates the statistical information related to the plurality of pieces of the first triple information based on the plurality of nodes including the node associated with the element of the object of one of the pieces of the first triple information and based on each of the nodes included from the node associated with the element of the object up to the node associated with the range from among the plurality of the nodes connected in accordance with the hierarchical relationship between each of the nodes. Furthermore, for example, the calculation unit 133 calculates the statistical information related to the plurality of pieces of the first triple information based on the nodes included from the node associated with the range up to the node at a predetermined number of stages from among the nodes.

Providing Unit 134

The providing unit 134 provides various kinds of information. For example, the providing unit 134 provides various kinds of information to the terminal device 10. For example, the providing unit 134 provides the statistical information calculated by the calculation unit 133 to the terminal device 10.

4. About Extraction of the Second Triple Information

For example, the calculation device 100 may also extract the second triple information by appropriately using various kinds of information. This point will be described with reference to FIG. 7. FIG. 7 is a diagram illustrating extraction of the second triple information according to the embodiment. For example, the calculation device 100 may also extract the second triple information based on the information stored in the ontology information storage unit 123.

FIG. 7 illustrates an example of extracting the second triple information based on the information stored in the ontology information storage unit 123 in a case where predicate is "<worksAt>".

As illustrated in FIG. 7, the calculation device 100 extracts the second triple information by using the information indicated by the ontology information TID101 that indicates the domain of the predicate "<worksAt>", the ontology information TID102 that indicates the range of the predicate "<worksAt>", and the class information CL11 (Step S21).

For example, the calculation device 100 specifies the subject in a case where predicate is "<worksAt>" by using the ontology information TID101 indicating that the term "<person>" is the top level concept for the subject of "<worksAt>". For example, the calculation device 100 specifies the object in a case where the predicate is "<worksAt>" by using the ontology information TID102 indicating that the term "<organization>" is the top level concept for the object of "<worksAt>".

Then, the calculation device 100 specifies the lower level class (lower level concept) of the term "<person>" of the lower level class (lower level concept) of the term "<organization>" by using various kinds of information, such as the pieces of the ontology information TID222, TID231, TID321, and the like in each of which the predicate is "rdfs:subClassOf" indicated by the class information CL11.

Then, the calculation device 100 extracts the second triple information based on the information specified described above. In the example illustrated in FIG. 7, the calculation device 100 extracts the second triple information having the hierarchical structure indicated by the schema triple information STP11.

The arrow line that connects each of the pieces of the second triple information indicated by the schema triple information STP11 illustrated in FIG. 7 indicates that the pieces of the connected second triple information have the relationship of the higher level concept and the lower level concept. Specifically, the arrow line indicates that the second triple information associated with the node on the side of the starting point of the arrow line is the lower level concept and the second triple information associated with the node on the side of the arrowhead is the higher level concept. Furthermore, in FIG. 7, a description of "<>" will be appropriately omitted.

For example, in the schema triple information STP11 illustrated in FIG. 7, the second triple information SID11 indicating the abstract meaning indicating that "a human works at an organization" is located in the top level concept. The second triple information SID11 is associated with the term "<person>" that is the domain of "<worksAt>" defined in the ontology information TID101 and is associated with the term "<organization>" that is the range of "<worksAt>" defined in the ontology information TID102.

Furthermore, for example, in the schema triple information STP11 illustrated in FIG. 7, the second triple information SID21 in which the subject is "<person>", the predicate is "<worksAt>", and the object is "<company>" is located in the lower level concept of the second triple information SID11. In this way, in the lower level concept of the second triple information SID11, the second triple information SID21 that has the common subject and predicate and that has the object of "<company>" that is the lower level class of "<organization>" is located.

Furthermore, for example, in the schema triple information STP11 illustrated in FIG. 7, the second triple information SID22 in which the subject is "<employee>", the predicate is "<worksAt>", and the object is "<organization>" is located in the lower level concept of the second triple information SID11. In this way, in the lower level concept of the second triple information SID11, the second triple information SID22 that has the common predicate and object and that has the subject "<employee>" that is the lower level class of "<person>". Furthermore, in FIG. 7, to simplify the description, only six pieces of the second triple information, i.e., the pieces of the second triple information SID11, SID21, SID22, SID31, SID32, and SID41 are illustrated; however, a large number of pieces of the second triple information may also be included in the schema triple information STP11 illustrated in FIG. 7.

5. Flow of the Calculation Process

In the following, the flow of the calculation process performed by the calculation system 1 according to the embodiment will be described with reference to FIG. 8. FIG. 8 is a flowchart illustrating an example of the calculation process according to the embodiment.

As illustrated in FIG. 8, the calculation device 100 acquires a plurality of pieces of the first triple information (Step S101). For example, the calculation device 100 acquires a plurality of pieces of the first triple information from the first triple information storage unit 121. Furthermore, the calculation device 100 acquires a plurality of pieces of the second triple information (Step S102). For example, the calculation device 100 acquires a plurality of pieces of the second triple information from the second triple information storage unit 122.

Then, the calculation device 100 calculates the statistical information related to the plurality of pieces of the first triple information based on the number of pieces of the first triple information associated with the plurality of pieces of the respective second triple information (Step S103). For example, the calculation device 100 calculates the statistical information indicated by the second triple information storage unit 122 illustrated in FIG. 1 based on the number of pieces of the first triple information associated with the plurality of each of the pieces of the second triple information.

6. Flow of the Process of Providing Information

In the following, the flow of a process of adding a count value of the second triple information in a case where one of the pieces (one piece) of the first triple information is targeted will be described with reference to FIG. 9. FIG. 9 is a flowchart illustrating an example of the calculation process performed on one of the pieces of the triple information according to the embodiment.

As illustrated in FIG. 9, the calculation device 100 acquires one of the pieces of the first triple information (Step S201). In the example illustrated in FIG. 1, the calculation device 100 acquires the first triple information FID11 in the triple information group in the first triple information storage unit 121.

Then, the calculation device 100 acquires, based on the ontology information, each of the classes related to the element of the subject of one of the pieces of the first triple information (Step S202). In the example illustrated in FIG. 1, the calculation device 100 extracts the ontology information in which the subject "<Jim>" is the subject of the first triple information FID11 and the predicate thereof is "rdf:type" from the ontology information storage unit 123. Then, the calculation device 100 acquires the domain related to the element of the predicate of one of the pieces of the first triple information (Step S203). In the example illustrated in FIG. 1, the calculation device 100 acquires, from the ontology information storage unit 123, the ontology information TID101 in which the subject is "<worksAt>" and the predicate is "rdfs:domain", i.e., a predetermined property indicating the domain.

Then, the calculation device 100 extracts, based on the ontology information, each of the first elements included from each of the classes up to the domain (Step S204). In the example illustrated in FIG. 1, the calculation device 100 extracts, as the information related to the class of the term "<Jim>", the terms associated with the nodes ND that are located, in the graph information ON11, from the four nodes ND101 to ND104 up to the node ND110 that is associated with term "<person>".

Furthermore, the calculation device 100 acquires, based on the ontology information, each of the classes related to the element of the object of one of the pieces of the first triple information (Step S205). In the example illustrated in FIG. 1, the calculation device 100 extracts the ontology information in which the object "<HOGE.inc>" of the first triple information FID11 is the subject and the predicate thereof is "rdf:type" from the ontology information storage unit 123. Then, the calculation device 100 acquires the range related to the element of the predicate of one of the pieces of the first triple information (Step S206). In the example illustrated in FIG. 1, the calculation device 100 acquires, from the ontology information storage unit 123, the ontology information TID102 in which the subject is "<worksAt>" and the predicate is "rdfs:range", i.e., a predetermined property indicating the range.

Then, the calculation device 100 extracts, based on the ontology information, each of the second elements included from each of the classes up to the range (Step S207). In the example illustrated in FIG. 1, the calculation device 100 extracts, as the information related to the class of "<HOGE.inc>", the terms associated with the nodes ND that are located, in the graph information ON21, from the four nodes ND201 to ND204 up to the node ND207 that is associated with the term "<organization>".

Then, the calculation device 100 adds the count value of the second triple information associated with each of the combinations of the first elements, the predicates, and each of the second elements (Step S208). In the example illustrated in FIG. 1, the calculation device 100 adds the count values of the second triple information associated with each of 15 combinations in which each of the terms associated with the five nodes of the nodes ND108 to ND110, ND112, and ND113 are the subject, the term "<worksAt>" is the predicate, and each of the terms associated with the three nodes of the nodes ND205 to ND207 is the object.

7. Effects

As described above, the calculation device 100 according to the embodiment includes the acquiring unit 131 and the calculation unit 133. The acquiring unit 131 acquires a plurality of pieces of the first triple information indicating the relationship among the three types of elements and a plurality of the pieces of the second triple information obtained based on the conceptual system in the plurality of the pieces of the first triple information. The calculation unit 133 calculates statistical information related to the plurality of pieces of the first triple information based on the number of pieces of the first triple information associated with each of the plurality of pieces of the second triple information acquired by the acquiring unit 131.

Consequently, the calculation device 100 according to the embodiment can enable the conceptual system in the plurality of pieces of triple information to be statistically grasped by calculating the statistical information related to the plurality of pieces of the first triple information based on the number of pieces of the first triple information associated with each of the plurality of pieces of the second triple information.

Furthermore, in the calculation device 100 according to the embodiment, the acquiring unit 131 acquires a plurality of pieces of the second triple information that are hierarchized based on the information related to a predetermined conceptual system.

Consequently, the calculation device 100 according to the embodiment can enable the conceptual system in the plurality of pieces of the triple information to be statistically grasped by acquiring the plurality of pieces of the second triple information hierarchized based on the information related to a predetermined conceptual system.

Furthermore, in the calculation device 100 according to the embodiment, the calculation unit 133 calculates the statistical information by using the second triple information indicating the relationship related to the three types of elements that are each of classes or higher level classes of the three types of elements in one of the pieces of the first triple information as the second triple information associated with one of the pieces of the first triple information.

Consequently, the calculation device 100 according to the embodiment can enable the conceptual system in the plurality of pieces of the triple information to be statistically grasped by calculating the statistical information by using the second triple information indicating the relationship related to the three types of elements that are each of classes or higher level classes of the three types of elements in one of the pieces of the first triple information as the second triple information associated with one of the pieces of the first triple information.

Furthermore, in the calculation device 100 according to the embodiment, the calculation unit 133 calculates the statistical information by using the second triple information indicating the relationship related to the three types of elements that are the class of one of the elements in one of the pieces of the first triple information and that are each of the classes or higher level classes of the other two elements as the second triple information associated with the one of the pieces of the first triple information.

Consequently, the calculation device 100 according to the embodiment can enable the conceptual system in the plurality of pieces of the triple information to be statistically grasped by calculating the statistical information by using the second triple information indicating the relationship related to the three types of elements that are the class of one of the elements in one of the pieces of the first triple information and that are each of the classes or higher level classes of the other two elements as the second triple information associated with the one of the pieces of the first triple information.

Furthermore, in the calculation device 100 according to the embodiment, the calculation unit 133 calculates the statistical information by using the second triple information indicating the relationship related to the three types of elements that are the class of the element of a predicate of one of the pieces of the first triple information and that are each of the classes or the higher level classes of the elements of a subject and an object as the second triple information associated with the one of the pieces of the first triple information.

Consequently, the calculation device 100 according to the embodiment can enable the conceptual system in the plurality of pieces of the triple information to be statistically grasped by calculating the statistical information by using the second triple information indicating the relationship related to the three types of elements that are the class of the element of a predicate of one of the pieces of the first triple information and that are each of the classes or the higher level classes of the elements of a subject and an object as the second triple information associated with the one of the pieces of the first triple information.

Furthermore, in the calculation device 100 according to the embodiment, the calculation unit 133 calculates the statistical information by using, based on the third triple information indicating the domain and the range related to the predicate of one of the pieces of the first triple information, the second triple information in which the element of the subject is included between the class of the subject of one of the pieces of the first triple information and the domain and the element of the object is included between the class of the object of one of the pieces of the first triple information as the second triple information associated with one of the pieces of the first triple information.

Consequently, the calculation device 100 according to the embodiment can enable the conceptual system in the plurality of pieces of the triple information to be statistically grasped by calculating the statistical information by using, based on the third triple information indicating the domain and the range related to the predicate of one of the pieces of the first triple information, the second triple information in which the element of the subject is included between the class of the subject of one of the pieces of the first triple information and the domain and the element of the object is included between the class of the object of one of the pieces of the first triple information as the second triple information associated with one of the pieces of the first triple information. Furthermore, by using the information related to the domain and the range, the calculation device 100 can efficiently perform the process of calculating the statistical information when compared with a case in which the information related to the domain and the range are not used. For example, by limiting a search region related to the element of the subject using the domain or by limiting a search region related to the element of the object using the range, the calculation device 100 can limit (for example, pruning) the conceptual system (space) that becomes the target of the process to be performed on each of the pieces of the first triple information; therefore, the calculation device 100 can efficiently perform the process of calculating the statistical information.

Furthermore, in the calculation device 100 according to the embodiment, the calculation unit 133 calculates the statistical information related to the plurality of pieces of the first triple information based on a plurality of nodes that includes the node associated with the element of the subject of one of the pieces of the first triple information and based on each of the nodes included from the node associated with the element of the subject up to the node associated with the domain from among the plurality of nodes connected in accordance with the hierarchical relationship between each of the nodes.

Consequently, the calculation device 100 according to the embodiment can enable the conceptual system in the plurality of pieces of the triple information to be statistically grasped by calculating the statistical information related to the plurality of pieces of the first triple information based on the plurality of nodes that includes the node associated with the element of the subject of one of the pieces of the first triple information and based on each of the nodes included in a region from the node associated with the element of the subject up to the node associated with the domain from among the plurality of nodes connected in accordance with the hierarchical relationship between each of the nodes. For example, by limiting the search region related to the element of the subject to the region up to the domain, the calculation device 100 can limit the conceptual system (space) that becomes the target of the process to be performed on each of the pieces of the first triple information; therefore, the calculation device 100 can efficiently perform the process of calculating the statistical information.

Furthermore, in the calculation device 100 according to the embodiment, the calculation unit 133 calculates the statistical information related to the plurality of pieces of the first triple information based on the nodes included from the node associated with the domain up to the node at a predetermined number of stages from among the nodes.

Consequently, the calculation device 100 according to the embodiment can enable the conceptual system in the plurality of pieces of the triple information to be statistically grasped by calculating the statistical information related to the plurality of pieces of the first triple information based on the nodes included from the node associated with the domain up to the node at a predetermined number of stages from among the nodes. For example, by limiting the search region related to the element of the subject to the region from the node associated with the domain up to the node at a predetermined number of stages, the calculation device 100 can limit the conceptual system (space) that becomes the target of the process to be performed on each of the pieces of the first triple information, statistical information;

therefore, the calculation device 100 can efficiently perform the process of calculating the statistical information.

Furthermore, in the calculation device 100 according to the embodiment, the calculation unit 133 calculates the statistical information related to the plurality of pieces of the first triple information based on the plurality of nodes including the node associated with the element of the object of one of the pieces of the first triple information and based on each of the nodes included from the node associated with the element of the object up to the node associated with the range from among the plurality of the nodes connected in accordance with the hierarchical relationship between each of the nodes.

Consequently, the calculation device 100 according to the embodiment can enable the conceptual system in the plurality of pieces of the triple information to be statistically grasped by calculating the statistical information related to the plurality of pieces of the first triple information based on the plurality of nodes including the node associated with the element of the object of one of the pieces of the first triple information and based on each of the nodes included from the node associated with the element of the object up to the node associated with the range from among the plurality of the nodes connected in accordance with the hierarchical relationship between each of the nodes. For example, by limiting the search region related to the element of the object to the region up to the range, the calculation device 100 can limit the conceptual system (space) that becomes the target of the process to be performed on each of the pieces of the first triple information; therefore, the calculation device 100 can efficiently perform the process of calculating the statistical information.

Furthermore, in the calculation device 100 according to the embodiment, the calculation unit 133 calculates the statistical information related to the plurality of pieces of the first triple information based on the nodes included from the node associated with the range up to the node at a predetermined number of stages from among the nodes.

Consequently, the calculation device 100 according to the embodiment can enable the conceptual system in the plurality of pieces of the triple information to be statistically grasped by calculating the statistical information related to the plurality of pieces of the first triple information based on the nodes included from the node associated with the range up to the node at a predetermined number of stages from among the nodes. Furthermore, by limiting the search region related to the element of the object to the region from the node associated with the range up to the node at a predetermined number of stages, the calculation device 100 can limit the conceptual system (space) that becomes the target of the process to be performed on each of the pieces of the first triple information; therefore, the calculation device 100 can efficiently perform the process of calculating the statistical information.

Furthermore, the calculation device 100 according to the embodiment includes the providing unit 134. The providing unit 134 provides the statistical information calculated by the calculation unit 133.

Consequently, the calculation device 100 according to the embodiment can enable the conceptual system in the plurality of pieces of the triple information related to the statistical information having a plurality of providing destinations to be statistically grasped by providing the calculated statistical information.

8. Hardware Configuration

Figure 10:
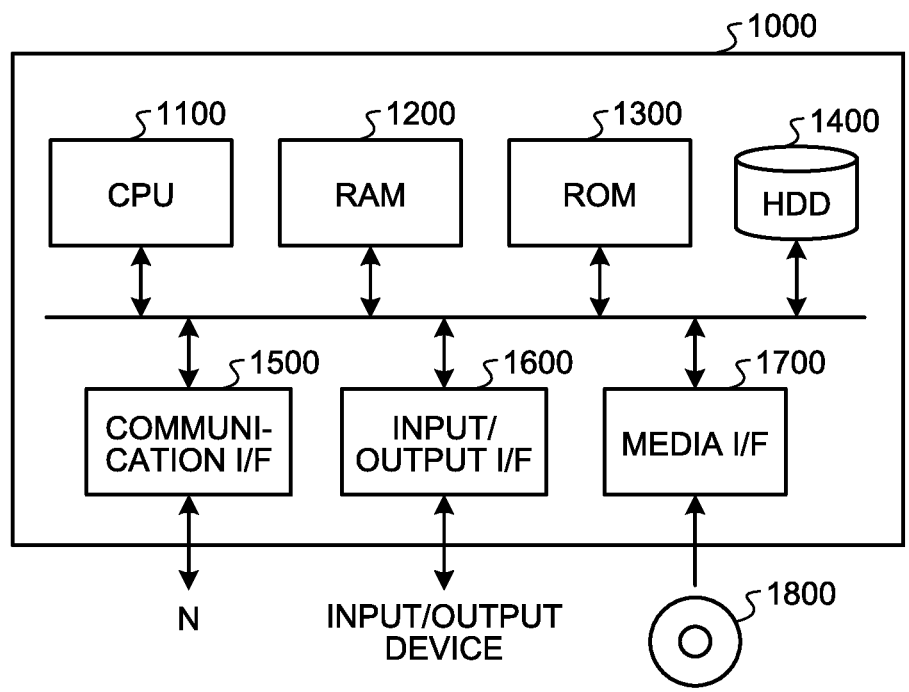
FIG. 10 is a diagram of hardware configuration illustrating an example of a computer that implements the function of the calculation device.

The calculation device 100 according to the embodiment is implemented by a computer 1000 having the configuration illustrated in, for example, FIG. 10. FIG. 10 is a diagram of hardware configuration illustrating an example of a computer that implements the function of the calculation device. the computer 1000 includes a CPU 1100, RAM 1200, a read only memory (ROM) 1300, a hard disk drive (HDD) 1400, a communication interface (I/F) 1500, an input/output interface (I/F) 1600, and a media interface (I/F) 1700.

The CPU 1100 operates based on the programs stored in the ROM 1300 or the HDD 1400 and performs control of each of the units. The ROM 1300 stores therein a boot program executed by the CPU 1100 at the startup of the computer 1000, programs depending on the hardware of the computer 1000, or the like.

The HDD 1400 stores therein programs executed by the CPU 1100, data used by the programs, and the like. The communication interface 1500 receives data from another device via the network N, sends the data to the CPU 1100, and sends the data created by the CPU 1100 to the other devices via the network N.

The CPU 1100 controls, via the input/output interface 1600, an output device, such as a display, a printer, or the like, and an input device, such as a keyboard, a mouse, or the like. The CPU 1100 acquires data from the input device via the input/output interface 1600. Furthermore, the CPU 1100 outputs the created data to the output device via the input/output interface 1600.

The media interface 1700 reads a program or data stored in a recording medium 1800 and provides the program or the data to the CPU 1100 via the RAM 1200. The CPU 1100 loads the program into the RAM 1200 from the recording medium 1800 via the media interface 1700 and executes the loaded program. The recording medium 1800 is, for example, an optical recording medium, such as a digital versatile disc (DVD), a phase change rewritable disk (PD), or the like, a magneto optical recording medium, such as a magneto-optical disk (MO), or the like, a tape medium, a magnetic recording medium, a semiconductor memory, or the like.

For example, when the computer 1000 functions as the calculation device 100 according to the embodiment, the CPU 1100 in the computer 1000 implements the function of the control unit 130 by executing the program loaded into the RAM 1200. The CPU 1100 in the computer 1000 reads and executes the programs from the recording medium 1800; however, as another example, the programs may also be acquired from another device via the network N.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

9. Others

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated. For example, the various kinds of information illustrated in each of the drawings are not limited to the information illustrated in the drawings.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, the processes described in the embodiment may appropriately be combined as long as the processes do not conflict with each other.

Furthermore, the "components (sections, modules, units)" described above can be read as "means", "circuits", or the like. For example, an acquiring unit can be read as an acquiring means or an acquiring circuit.

According to an aspect of an embodiment, an advantage is provided in that it is possible to enable a conceptual system in a plurality of pieces of triple information to be statistically grasped.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A calculation device comprising:
a processor programmed to function as:
an acquiring unit that acquires a plurality of pieces of first triple information indicating a relationship related to three types of elements and a plurality of pieces of second triple information obtained based on a conceptual system in the plurality of pieces of the first triple information; and
a calculation unit that calculates statistical information related to the plurality of pieces of the first triple information based on the number of pieces of the first triple information associated with each of the plurality of pieces of the second triple information acquired by the acquiring unit,
wherein the calculation unit calculates the statistical information by using, based on third triple information indicating a domain and a range related to the predicate of one of the pieces of the first triple information, the second triple information in which the element of the subject is included between the class of the subject of the one of the pieces of the first triple information and the domain and the element of the object is included between the class of the object of the one of the pieces of the first triple information and the range as the second triple information associated with the one of the pieces of the first triple information.

2. The calculation device according to claim 1, wherein the acquiring unit acquires the plurality of pieces of the second triple information hierarchized based on information related to a predetermined conceptual system.

3. The calculation device according to claim 1, wherein the calculation unit calculates the statistical information by using the second triple information indicating the relationship related to the three types of elements that are each of classes or higher level classes of the three types of elements in one of the pieces of the first triple information as the second triple information associated with the one of the pieces of the first triple information.

4. The calculation device according to claim 1, wherein the calculation unit calculates the statistical information by using the second triple information indicating the relationship related to the three types of elements that are the class of one of the elements in one of the pieces of the first triple information and that are each of classes or higher level classes of the other two elements as the second triple information associated with the one of the pieces of the first triple information.

5. The calculation device according to claim 1, wherein the calculation unit calculates the statistical information by using the second triple information indicating the relationship related to the three types of elements that are the class of the element of a predicate of one of the pieces of the first triple information and that are each of classes or higher level classes of the elements of a subject and an object as the second triple information associated with the one of the pieces of the first triple information.

6. The calculation device according to claim 1, wherein the calculation unit calculates the statistical information related to the plurality of pieces of the first triple information based on a plurality of nodes including the node associated with the element of the subject of one of the pieces of the first triple information and based on each of the nodes included from the node associated with the element of the subject up to the node associated with the domain from among the plurality of the nodes connected in accordance with the hierarchical relationship between each of the nodes.

7. The calculation device according to claim 6, wherein the calculation unit calculates the statistical information related to the plurality of pieces of the first triple information based on the nodes included from the node associated with the domain up to the node at a predetermined number of stages from among the nodes.

8. The calculation device according to claim 1, wherein the calculation unit calculates the statistical information related to the plurality of pieces of the first triple information based on the plurality of the nodes including the node associated with the element of the object of one of the pieces of the first triple information and based on each of the nodes included from the node associated with the element of the object up to the node associated with the range from among the plurality of the nodes connected in accordance with the hierarchical relationship between each of the nodes.

9. The calculation device according to claim 8, wherein the calculation unit calculates the statistical information related to the plurality of pieces of the first triple information based on the nodes included from the node associated with the range up to the node at the predetermined number of stages from among each of the nodes.

10. The calculation device according to claim 1, wherein the processor is further programmed to function as a providing unit that provides the statistical information calculated by the calculation unit.

11. A calculation method executed by a computer, the calculation method comprising:
acquiring a plurality of pieces of first triple information indicating a relationship related to three types of elements and a plurality of pieces of second triple information based on a conceptual system in the plurality of pieces of the first triple information; and
calculating statistical information related to the plurality of pieces of the first triple information based on the number of pieces of the first triple information associated with each of the plurality of pieces of the second triple information acquired at the acquiring,
wherein the calculating calculates the statistical information by using, based on third triple information indicating a domain and a range related to the predicate of one of the pieces of the first triple information, the second triple information in which the element of the subject is included between the class of the subject of the one of the pieces of the first triple information and the domain and the element of the object is included between the class of the object of the one of the pieces of the first triple information and the range as the second triple information associated with the one of the pieces of the first triple information.

12. A non-transitory computer-readable recording medium having stored therein a calculation program that causes a computer to execute a process comprising:

acquiring a plurality of pieces of first triple information indicating a relationship related to three types of elements and a plurality of pieces of second triple information based on a conceptual system in the plurality of pieces of the first triple information; and calculating statistical information related to the plurality of pieces of the first triple information based on the number of pieces of the first triple information associated with each of the plurality of pieces of the second triple information acquired at the acquiring, wherein the calculating calculates the statistical information by using, based on third triple information indicating a domain and a range related to the predicate of one of the pieces of the first triple information, the second triple information in which the element of the subject is included between the class of the subject of the one of the pieces of the first triple information and the domain and the element of the object is included between the class of the object of the one of the pieces of the first triple information and the range as the second triple information associated with the one of the pieces of the first triple information.

* * * * *